(12) United States Patent
Rayes et al.

(10) Patent No.: US 7,607,021 B2
(45) Date of Patent: Oct. 20, 2009

(54) ISOLATION APPROACH FOR NETWORK USERS ASSOCIATED WITH ELEVATED RISK

(75) Inventors: Mark Ammar Rayes, San Ramon, CA (US); Michael Cheung, San Jose, CA (US); Ralph Droms, Westford, MA (US); Petre Dini, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 743 days.

(21) Appl. No.: 10/797,773

(22) Filed: Mar. 9, 2004

(65) Prior Publication Data

US 2005/0204162 A1   Sep. 15, 2005

(51) Int. Cl.
G06F 12/14 (2006.01)
G06F 11/30 (2006.01)

(52) U.S. Cl. .......................... 713/188; 726/24
(58) Field of Classification Search .................. 726/11; 713/153; 709/203; 370/1
See application file for complete search history.

(56) References Cited

U.S. PATENT DOCUMENTS

| | | | |
|---|---|---|---|
| 5,787,161 A | 7/1998 | Rayes et al. | |
| 5,933,645 A | 8/1999 | Wallack | |
| 5,983,360 A * | 11/1999 | Ugajin | 714/11 |
| 5,987,611 A * | 11/1999 | Freund | 726/4 |
| 6,038,322 A | 3/2000 | Harkins | |
| 6,049,834 A | 4/2000 | Khabardar et al. | |
| 6,119,231 A | 9/2000 | Foss et al. | |
| 6,131,163 A | 10/2000 | Wiegel | |
| 6,134,559 A | 10/2000 | Brumme et al. | |
| 6,215,878 B1 | 4/2001 | Harkins | |
| 6,282,546 B1 | 8/2001 | Gleichauf et al. | |
| 6,298,383 B1 | 10/2001 | Gutman et al. | |
| 6,298,444 B1 | 10/2001 | Foss et al. | |
| 6,301,613 B1 | 10/2001 | Ahlstrom et al. | |
| 6,301,668 B1 | 10/2001 | Gleichauf et al. | |
| 6,324,656 B1 | 11/2001 | Gleichauf et al. | |
| 6,327,618 B1 | 12/2001 | Ahlstrom et al. | |
| 6,347,339 B1 | 2/2002 | Morris et al. | |
| 6,381,646 B2 | 4/2002 | Zhang et al. | |
| 6,396,833 B1 | 5/2002 | Zhang et al. | |
| 6,415,321 B1 | 7/2002 | Gleichauf et al. | |
| 6,418,468 B1 | 7/2002 | Ahlstrom et al. | |
| 6,427,174 B1 | 7/2002 | Sitaraman et al. | |
| 6,434,700 B1 | 8/2002 | Alonso et al. | |

(Continued)

OTHER PUBLICATIONS

U.S. Appl. No. 10/078,377, filed Jul. 2002, Hanson et al.*

(Continued)

*Primary Examiner*—Kambiz Zand
*Assistant Examiner*—Dant B Shaifer Harriman
(74) *Attorney, Agent, or Firm*—Hickman Palermo Truong & Becker LLP

(57) ABSTRACT

An isolation approach for network users associated with elevated risk is disclosed for protecting networks. In one approach a method comprises the computer-implemented steps of determining a user identifier associated with a network device that has caused a security event in a network; causing the network device to receive a network address that is selected from a subset of addresses within a specified pool associated with suspected malicious network users; and configuring one or more security restrictions with respect to the selected network address.

47 Claims, 6 Drawing Sheets

U.S. PATENT DOCUMENTS

| | | | |
|---|---|---|---|
| 6,442,333 B1 * | 8/2002 | Izawa | 386/95 |
| 6,463,061 B1 | 10/2002 | Rekhter et al. | |
| 6,463,474 B1 | 10/2002 | Fuh et al. | |
| 6,466,977 B1 | 10/2002 | Sitaraman et al. | |
| 6,477,651 B1 | 11/2002 | Teal | |
| 6,483,921 B1 | 11/2002 | Harkins | |
| 6,484,261 B1 | 11/2002 | Wiegel | |
| 6,484,315 B1 | 11/2002 | Ziese | |
| 6,487,666 B1 | 11/2002 | Shanklin et al. | |
| 6,490,289 B1 | 12/2002 | Zhang et al. | |
| 6,490,290 B1 | 12/2002 | Zhang et al. | |
| 6,499,107 B1 | 12/2002 | Gleichauf et al. | |
| 6,539,431 B1 | 3/2003 | Sitaraman et al. | |
| 6,553,489 B1 | 4/2003 | Osler et al. | |
| 6,560,204 B1 | 5/2003 | Rayes | |
| 6,563,816 B1 | 5/2003 | Nodoushani et al. | |
| 6,567,917 B1 | 5/2003 | Ziese | |
| 6,578,147 B1 | 6/2003 | Shanklin et al. | |
| 6,584,124 B1 | 6/2003 | Blanc et al. | |
| 6,597,957 B1 | 7/2003 | Beakley | |
| 6,609,154 B1 | 8/2003 | Fuh et al. | |
| 6,609,205 B1 | 8/2003 | Bernhard et al. | |
| 6,633,761 B1 * | 10/2003 | Singhal et al. | 455/436 |
| 6,651,096 B1 | 11/2003 | Gai et al. | |
| 6,654,792 B1 * | 11/2003 | Verma et al. | 709/208 |
| 6,658,002 B1 | 12/2003 | Ross et al. | |
| 6,680,998 B1 | 1/2004 | Bell et al. | |
| 6,684,331 B1 | 1/2004 | Srivastava | |
| 6,973,477 B1 * | 12/2005 | Martino | 709/203 |
| 7,127,524 B1 * | 10/2006 | Renda et al. | 709/245 |
| 7,194,004 B1 * | 3/2007 | Thomsen | 370/401 |
| 7,234,163 B1 * | 6/2007 | Rayes et al. | 726/22 |
| 2001/0051865 A1 | 12/2001 | Kerr et al. | |
| 2002/0098840 A1 | 7/2002 | Hanson et al. | |
| 2003/0041153 A1 | 2/2003 | Sharma | |
| 2003/0105866 A1 | 6/2003 | Colrain et al. | |
| 2003/0105867 A1 | 6/2003 | Colrain et al. | |
| 2003/0105993 A1 | 6/2003 | Colrain et al. | |
| 2003/0123421 A1 | 7/2003 | Feige et al. | |
| 2003/0142684 A1 * | 7/2003 | Miyachi | 370/401 |
| 2003/0149783 A1 | 8/2003 | McDaniel | |
| 2003/0182433 A1 | 9/2003 | Kulkarni et al. | |
| 2003/0191966 A1 | 10/2003 | Gleichauf et al. | |
| 2003/0217145 A1 | 11/2003 | Leung et al. | |
| 2003/0217180 A1 | 11/2003 | Chandra et al. | |
| 2003/0224788 A1 | 12/2003 | Leung et al. | |
| 2003/0236827 A1 | 12/2003 | Patel et al. | |
| 2004/0008682 A1 | 1/2004 | Miriyala | |
| 2004/0034871 A1 | 2/2004 | Lu et al. | |

OTHER PUBLICATIONS

Cisco Systems, Inc., "Release Notes for Cisco Content Routing Software, Release 1.1," 1992-2002, http://www.cisco.com/univercd/cc/td/doc/product/webscale/cr/cr4430/cr_11rn.htm, data retrieved Feb. 11, 2004, pp. 1-19.

Cisco Systems, Inc., "IP Source Tracker," 2003, http://www.cisco.com/univercd/cc/td/doc/product/software/ios120/120newft/120limit/120s/120s21/ipst.htm, data retrieved Feb. 11, 2004, pp. 1-15.

Cisco Systems, Inc., "Configuring Denial of Service Protection," 1992-2003, http://www.cisco.com/univercd/cc/td/doc/product/core/cis/7600/software/121e/swcg/dos.htm, data retrieved Feb. 11, 2004, pp. 1-7.

Cisco Systems, Inc., "Cisco IOS Software Release 12.3(4)T: New Security Features and Hardware," 1992-2003, http://www.cisco.com/warp/public/cc/pd/iosw/prodlit/2358_pp.htm, data retrieved Feb. 11, 2004, pp. 1-11.

Cisco Systems, Inc., "Characterizing and Tracing Packet Floods Using Cisco Routers," 1992-2003, http://www.cisco.com/warp/public/707/22.html, data retrieved Feb. 11, 2004, pp. 1-9.

Cisco Systems, Inc., "Release Notes for Cisco Cache Engine 500 Series, Software Version 2.1.0," 1992-2002, http://www.cisco.com/univercd/cc/td/doc/product/webscale/webcache/ce21/rnce21.htm, data retrieved Feb. 11, 2004, pp. 1-11.

Cisco Systems, Inc., "SAFE Nimda Attack Mitigation," 1992-2003, http://www.cisco.com/warp/public/cc/so/cuso/epso/sqfr/snam_wp.htm, data retrieved Feb. 11, 2004, pp. 1-6.

Cisco Systems, Inc., "Cisco IOS Software Release 11.3 New Features," 1992-2002, http://www.cisco.com/warp/public/cc/pd/iosw/iore/iore113/prodlit/706_pp.htm, data retrieved Feb. 11, 2004, pp. 1-45.

Cisco Systems, Inc., "Monitoring the System," Chapter 2, Cisco ICS 7750 Administration and Troubleshooting Guide, 1992-2002, http://www.cisco.com/univercd/cc/td/doc/product/voice/ics7750/tblshoot/monitor.htm, data retrieved Feb. 11, 2004, pp. 2-1-2-28.

Cisco Systems, Inc., "Monitoring," Chapter 13; VPN 3002 Hardware Client User Guide, 1989-2000, http://www.cisco.com/univercd/cc/td/doc/product/vpn/vpn3002/3_0/user_gd/monitor.htm, data retrieved Feb. 11, 2004, pp. 13-1-13-47.

Cisco Systems, Inc., "Security Reference Information," 1992-2003, http://www.cisco.com/warp/public/707/ref.html, data retrieved Feb. 11, 2004, pp. 1-3.

Cisco Systems, Inc., "Cisco Security Advisory: TCP Loopback DoS Attack (land.c) and Cisco Devices," 1992-2003, http://www.cisco.com/warp/public/770/land-pub.shtml, data retrieved Feb. 11, 2004, pp. 1-9.

Cisco Systems, Inc., "Network Security Policy: Best Practices White Paper," 1992-2003, http://www.cisco.com/warp/public/126/secpol.html, data retrieved Feb. 11, 2004, pp. 1-7.

Cisco Systems, Inc., "Protecting Your Core: Infrastructure Protection Access Control Lists," 1992-2003, 10 pages.

Cisco Systems, Inc., "Configuring Denial of Service Protection," Chapter 24, Catalyst 6500 Series Switch Cisco IOS Software Configuration Guide—Release 12.1E Guide, pp. 24-1-24-8.

Cisco Systems, Inc., "Cisco Catalyst 4500 Series Supervisor Engine 11-Plus", Data Sheet, 2004, pp. 1-15.

Groudan, Adam, Cisco Systems, Inc., "The Cisco SelfDefending Network: Campus—Layer 2 Security & Network Admission Control", slide presentation, pp. 1-39.

Patent Cooperation Treaty, "International Search Report," PCT/US05/06738, dated Aug. 11, 2005, 5 pages.

Current Claims, PCT/US05/06738, 5 pages.

* cited by examiner

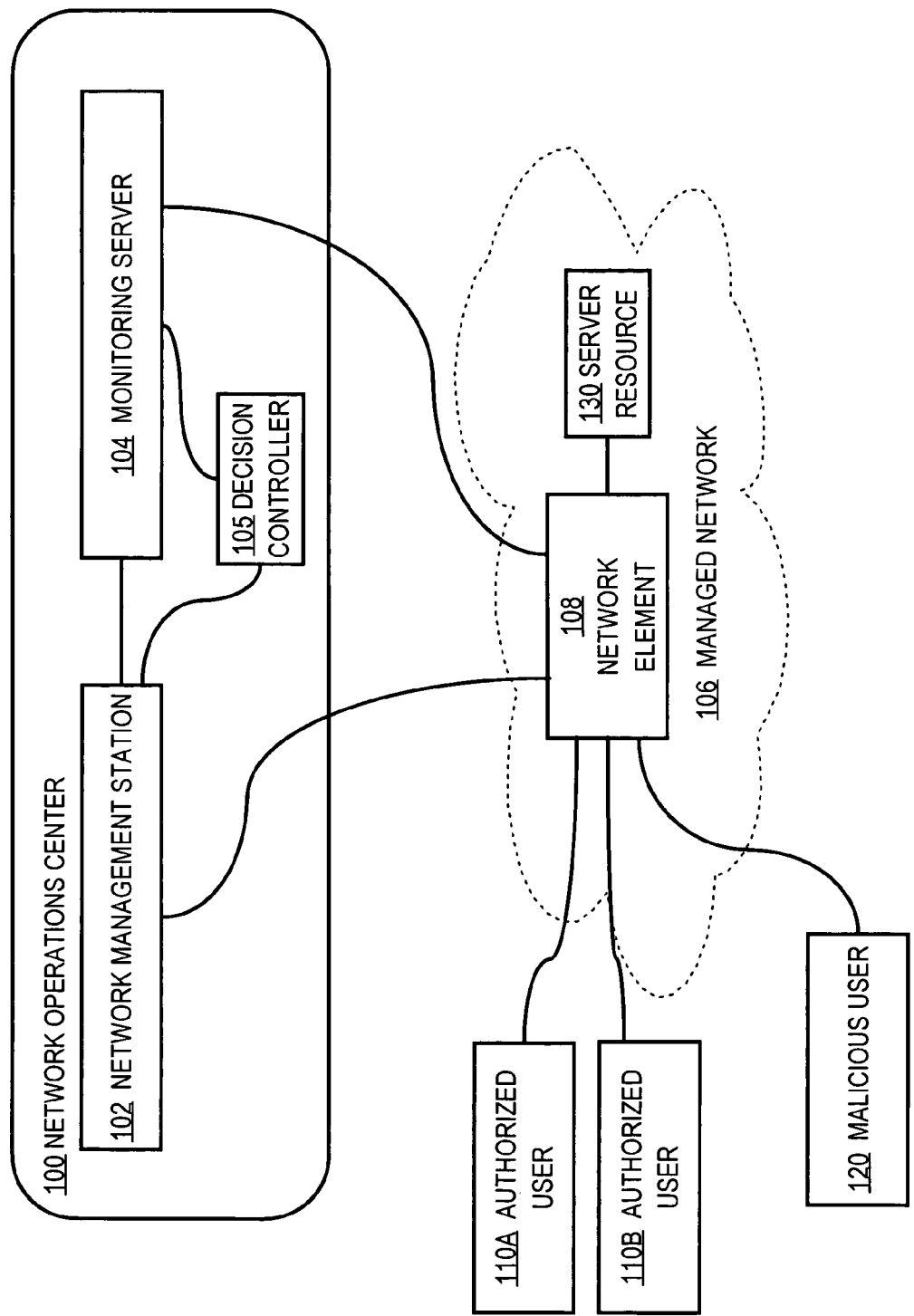

_US 7,607,021 B2_

ISOLATION APPROACH FOR NETWORK USERS ASSOCIATED WITH ELEVATED RISK

FIELD OF THE INVENTION

The present invention generally relates to computer networks. The invention relates more specifically to approaches for improving network security.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

U.S. patent application Ser. No. 10/688,051, filed Oct. 16, 2003, entitled "Policy-based network security management," by Mark Ammar Rayes et al. (Rayes et al.), describes a policy-based security management controller that can determine what action to take in response to network security attacks, utilizing network alert state, the risk level, and network health state information. In one embodiment, the controller identifies potential intruders using historical alarms or events.

The controller also allows service providers to take action against possible intruders. Action may be required to prevent malicious users from achieving a denial of service (DoS), through techniques such as IP address spoofing, extraneous requests for network addresses under dynamic host control protocol (DHCP) and MAC address spoofing, especially when the network alert level is high. To preserve network integrity and stability, it is important to prevent attackers from inflicting further damage before network performance degrades.

The security controller is the first application that captures possible intruders and takes appropriate action as defined by service providers. However, it may be desirable to take action against a potentially malicious user that is less drastic than completely disabling the user's network access. For example, an unskilled user who is changing a device's IP address too many times during setup time might be inappropriately identified as a malicious user mounting a DoS attack. Denying service to this type of innocent user, because the security controller has inappropriately classified the user as, malicious may induce the user to select another service provider.

On the other hand, the controller is responsible for preventing possible catastrophic network failure, especially during bad network performance. Detailed analysis of suspected user behavior is needed before a service provider can determine whether the suspected user is truly malicious, and such analysis takes time. The controller may decide to disable the user's access, in order to ensure further damage cannot be inflicted, and without waiting for such analysis, despite the fact that this decision may be wrong.

As a result, there is a need for a way to allow service providers to prevent damage to a network without completing blocking network access, while allowing time to apply further diagnostics and analysis to the suspected user's traffic behavior, and without inducing frustration on the part of non-malicious users.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram of an example network context that may be used to implement an embodiment;

DETAILED DESCRIPTION

Figure 1B:
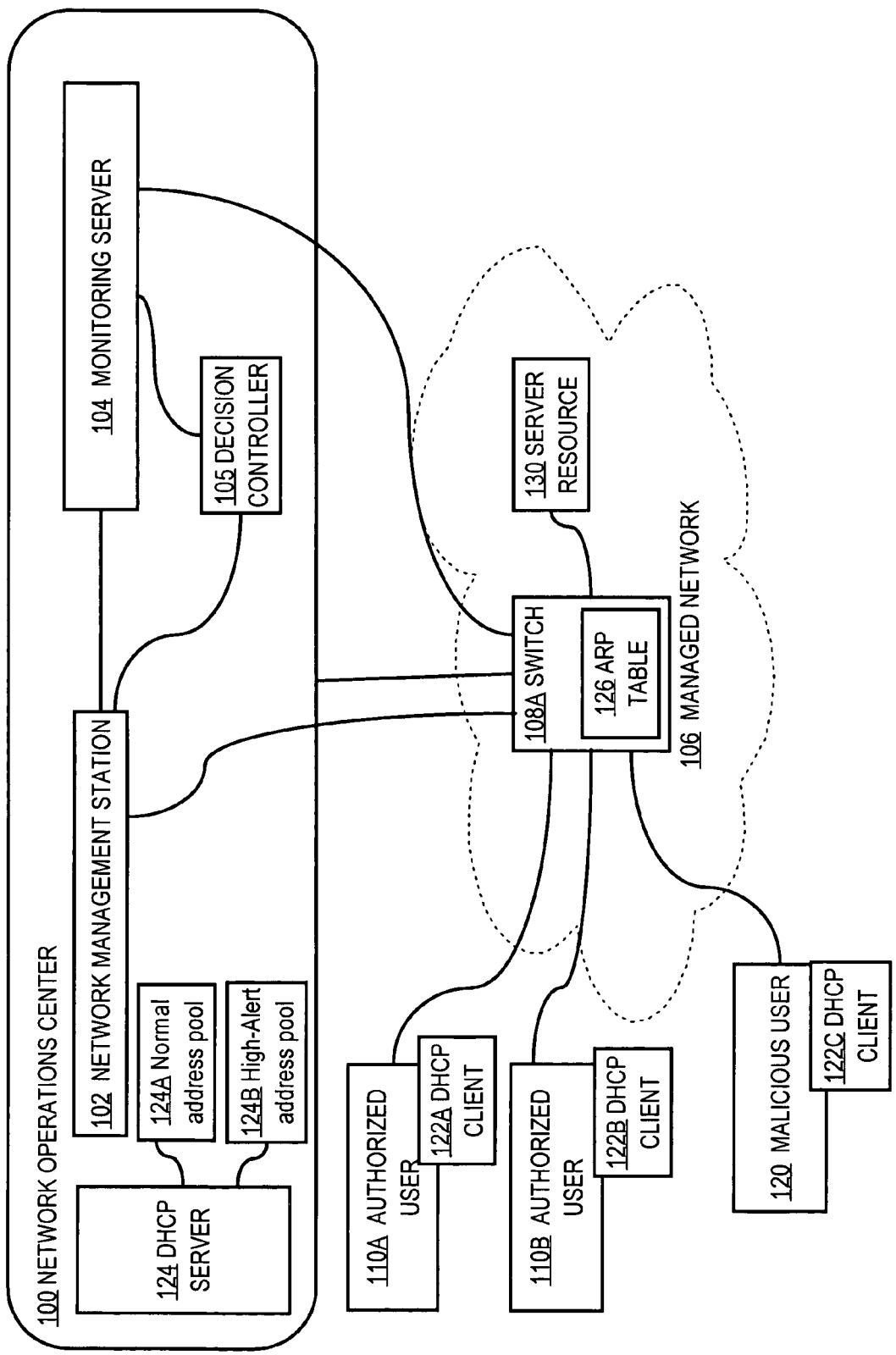
FIG. 1B is a block diagram of an alternative network context that may be used.

Methods and apparatus providing an isolation approach for network users associated with elevated risk are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Isolation Approach for Network Users Associated with Elevated Risk
      2.1 Placing Users in Elevated Risk User Group
      2.2 Configuring Security Restrictions
      2.3 Removing Users from Elevated Risk User Group
      2.4 Interaction with Security Controller
      2.5 Variant Embodiments
   3.0 Implementation Mechanisms—Hardware Overview
   4.0 Extensions and Alternatives 1.0 General Overview The needs identified in the foregoing Background, and other needs and objects that will become apparent for the following description, are achieved in the present invention, which comprises an isolation approach for network users associated with elevated risk. According to one approach, a method comprises the computer-implemented steps of determining a user identifier associated with a network device that has caused a security event in a network; causing the network device to receive a network address that is selected from a subset of addresses within a specified pool associated with suspected malicious network users; and configuring one or more security restrictions with respect to the selected network address.

In a second aspect, a method comprises the computer-implemented steps of receiving information identifying a security event in a network; correlating the security event information with network user information to result in determining a network user associated with the network device; placing the user in an elevated risk security group; configuring one or more security restrictions with respect to the selected network address; determining whether a malicious act caused the security event; if a malicious act caused the security event, then providing information about the security event or malicious act to a security decision controller; and if a malicious act did not cause the security event, then removing the user from the elevated risk group.

The foregoing aspects may include many other features, alternatives and variations that will become apparent from the following description and claims. Further, in other aspects, the invention encompasses a computer apparatus and a computer-readable medium configured to carry out the foregoing steps.

The disclosure herein introduces a "High-Alert" network user group. Network users who are suspected of performing malicious acts against the network, such as any type of spoofing attack, denial of service attacks, etc., are forced into the High-Alert user group. Traffic of users in the High-Alert user group is routed through a monitoring server at which detailed traffic analysis is performed to determine whether the user is actually performing malicious acts, so that appropriate action can be taken. Decisions about appropriate action may be made with the assistance of a security controller. Users in the High-Alert user group continue to receive restricted network service while monitoring is performed and before the security controller determines a decision. As a result, user service is not completely interrupted. In some cases, this ensures that any service agreement between the user and the service provider is not breached.

In one specific embodiment, a security event is detected and correlated with a user. The user is placed in a High-Alert user group by changing the network address of the end station that the user is using. Action in the network by the suspected user is closely monitored by routing all traffic of the suspected malicious user through a monitoring server. Network access of suspected users is limited or restricted so that the users cannot damage the network. For example, a suspect user in the High-Alert user group cannot change the MAC address recognized by the network for the user's end station, the user is required to receive a network address from a special pool of addresses reserved for the High-Alert user group, etc. More significant action, such as terminating network access to the user or placing the user back in an unrestricted user group, is performed only after an administrator has determined that the user actually is committing security violations. Further, in one embodiment, a single action may be applied to all suspect users who are in the High-Alert user group. Such collective action.may be appropriate, for example, in the case of emergencies. An example of a collective action is to put service to all members of the High-Alert user group temporarily on hold and to provide an explanatory message.

In a particular embodiment, DHCP dynamic address distribution, IP address subnets, switch ARP tables, and network management techniques are applied to put suspected users in the High-Alert group, under which the users' traffic is closely monitored by the network, while the user service as specified in the service contract is not affected or only partially affected.

2.0 Isolation Approach for Network Users Associated with Elevated Risk

FIG. 1A is a block diagram of an example network context that may be used to implement an embodiment. FIG. 1A is intended to illustrate one example context; however, the approaches described herein may be practiced in any network context. In FIG. 1A, a network operations center 100 is owned or operated by a network service provider that manages a managed network 106. Typically a private enterprise uses the managed network 106 and is a customer of the network service provider.

One or more authorized users 110A, 110B send or receive data or multimedia communications using a network element 108 to interact with a server resource 130. Network element 108 may comprise a router, switch, or other infrastructure element, and managed network 106 may comprise any number of network elements that are coupled in any topology that is useful or desirable. Further, managed network 106 may comprise any number of end stations or resources in addition to server resource 130, such as other servers, workstations or personal computers, printers, storage, and other peripherals.

A malicious user 120 also may attempt to send or receive unauthorized data or commands using managed network 106. Malicious user 120 may be one who is attempting to harm managed network 106 or render server resource 130 or network element 108 unavailable to others, or the unauthorized user may be an innocent individual who is unwittingly performing unauthorized acts, or a number of attempts to perform an action that is deemed excessive according to a specified access policy.

Authorized users 110A, 110B and malicious user 120 as shown in FIG. 1A broadly represent any end station device, such as a personal computer, workstation, etc., alone or together with network infrastructure elements such as routers, hubs, etc., and alone or together with an associated user who uses, owns or operates such equipment.

Network operations center comprises a network management station (NMS) 102, a monitoring server 104, and a decision controller 105. The network management station 102 comprises a workstation or computer that hosts network management software providing functions such as configuration of network element 108. The monitoring server 104 can perform traffic analysis or detailed monitoring functions with respect to network element 108. The decision controller 105 can receive input from NMS 102 and monitoring server 105, and can determine what actions should be taken in managed network 106 to prevent the managed network from attack or harm by an unauthorized user.

FIG. 1B is a block diagram of an alternative network context that may be used. FIG. 1B specifically indicates that NOC 100 may include a DHCP server 124 for dynamically serving network addresses to authorized users 110A, 110B and malicious user 120. The DHCP server 124 may select addresses from a Normal address pool 124A or from a High-Alert address pool 124B under control of appropriate decision logic as further described below. The authorized users 110A, 110B and malicious user 120 each host a DHCP client 122A, 122B, 122C, respectively, that interacts with DHCP server 124 using DHCP messages as further described herein.

The authorized users 110A, 110B and malicious user 120 are communicatively coupled to switch 108A, which maintains an address resolution protocol (ARP) table 126. In one embodiment the ARP table 126 maintains, among other information, associations of MAC addresses of the authorized users 110A, 110B and malicious user 120 to IP addresses that have been assigned to the authorized users 110A, 110B and malicious user 120 by DHCP server 124. Interaction of the ARP table 126 with the DHCP server 124 is described further below.

Figure 2:
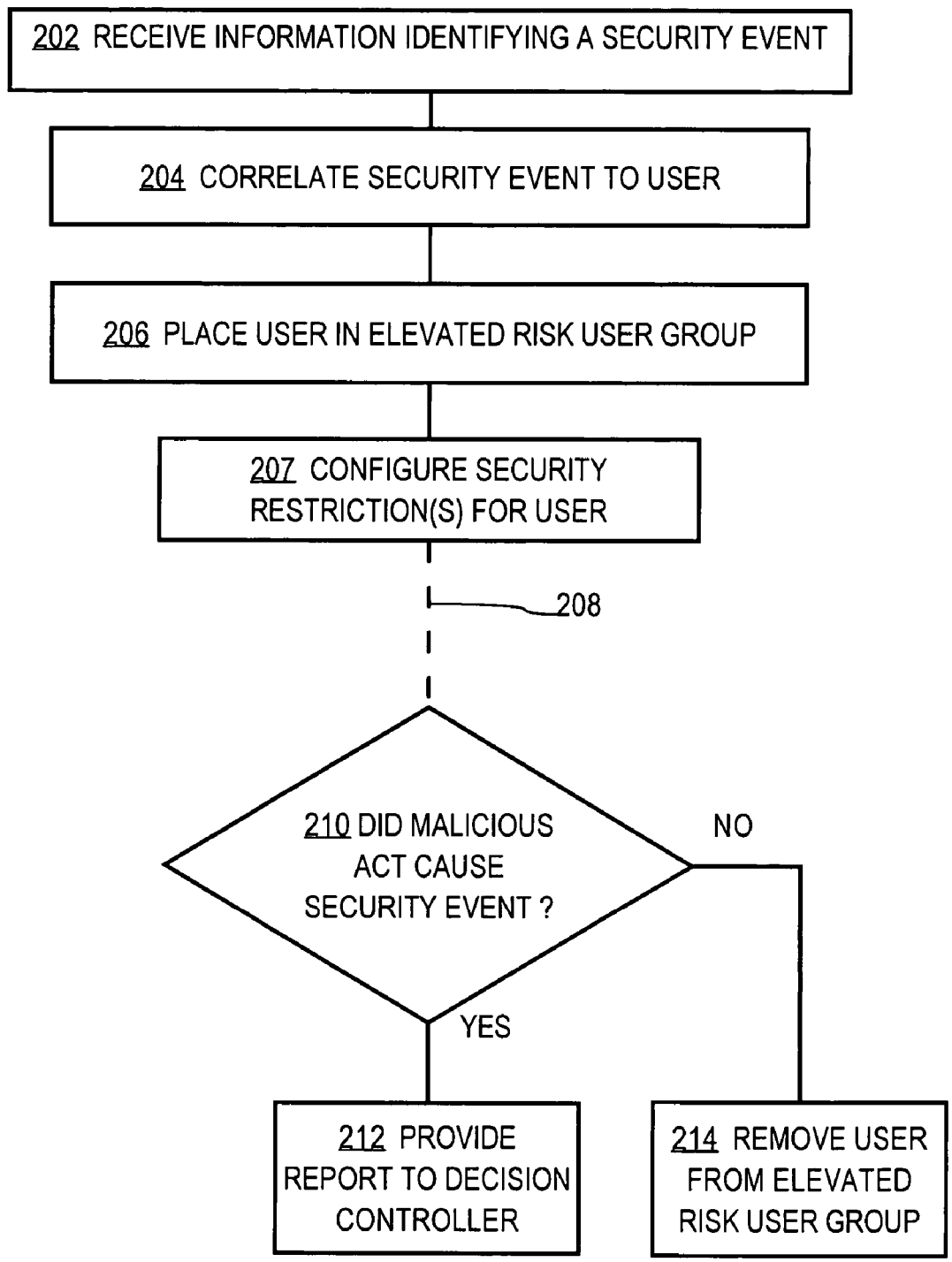
FIG. 2 is a flow diagram that illustrates a high level overview of one embodiment of an isolation approach for network users associated with elevated risk.

FIG. 2 is a flow diagram that illustrates a high level overview of one embodiment of an isolation approach for network users associated with elevated risk. In step 202, information identifying a security event is received. In step 204, the security event information is correlated to result in identifying a user that caused or is associated with the security event. Correlation may involve actions such as looking up a network address, which is carried in the security event information, in a database of user information.

In step 206, the user is placed in an elevated risk user group. Specific approaches for placing the user in the elevated risk user group are described in subsequent sections herein.

In step 207, one or more security restrictions are configured for the user. The security restrictions limit actions that the user can perform in the managed network. In general, the purpose of configuring the security restrictions is to isolate the malicious user in the network, to thereby quarantine the suspected malicious users so that further damage to the network can be avoided. Specific approaches for placing the user in the elevated risk user group are described in subsequent sections herein.

At an indefinite time after step 207, as denoted by broken line 208, a test is performed at step 210 to determine whether a malicious act caused the security event about which information was received in step 202. Step 210 may involve, for example, detailed review of the security event by network administration personnel, performing traffic analysis with respect to the identified user or network elements that the user is using, etc. In one embodiment, a user is classified as malicious if the user is caught performing suspicious network actions, e.g., contaminating the ARP table 126 of switch 108A (FIG. 1B), IP spoofing, etc. Such actions can be detected by network hardware executing specified software applications, such as the ARP Inspection feature or Dynamic ARP Inspection feature in the Cisco Catalyst 6500 series of switches from Cisco Systems, Inc. Such actions also be determined by the security controller described in Rayes et al.

In step 212, if the test of step 210 is true, then a report is provided to a decision controller. In step 214, if the test of step 210 is false, then the user is removed from the elevated risk user group. Specific approaches for removing the user from the elevated risk user group are described in subsequent sections herein.

Using the foregoing approach, a user who is associated with a security event is effectively restricted or quarantined while detailed review of the user, the security event, or other information is conducted. The user is not completely cut off from accessing the managed network, but the actions of the user are restricted. As a result, malicious users can be quarantined while their actions are evaluated, and innocent users do not suffer disconnection or frustration associated with lack of network access.

2.1 Placing Users in Elevated Risk User Group

Figure 3A:
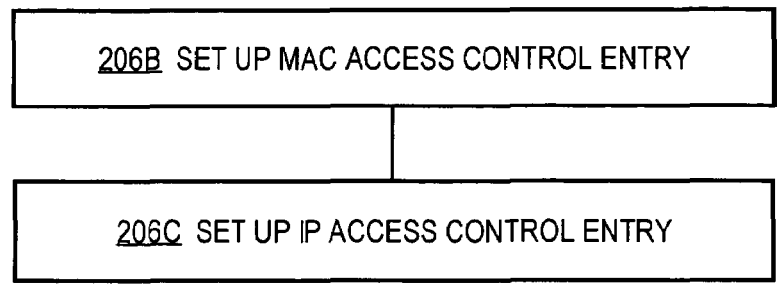
FIG. 3A is a flow diagram of a process of configuring security restrictions.
Figure 3B:
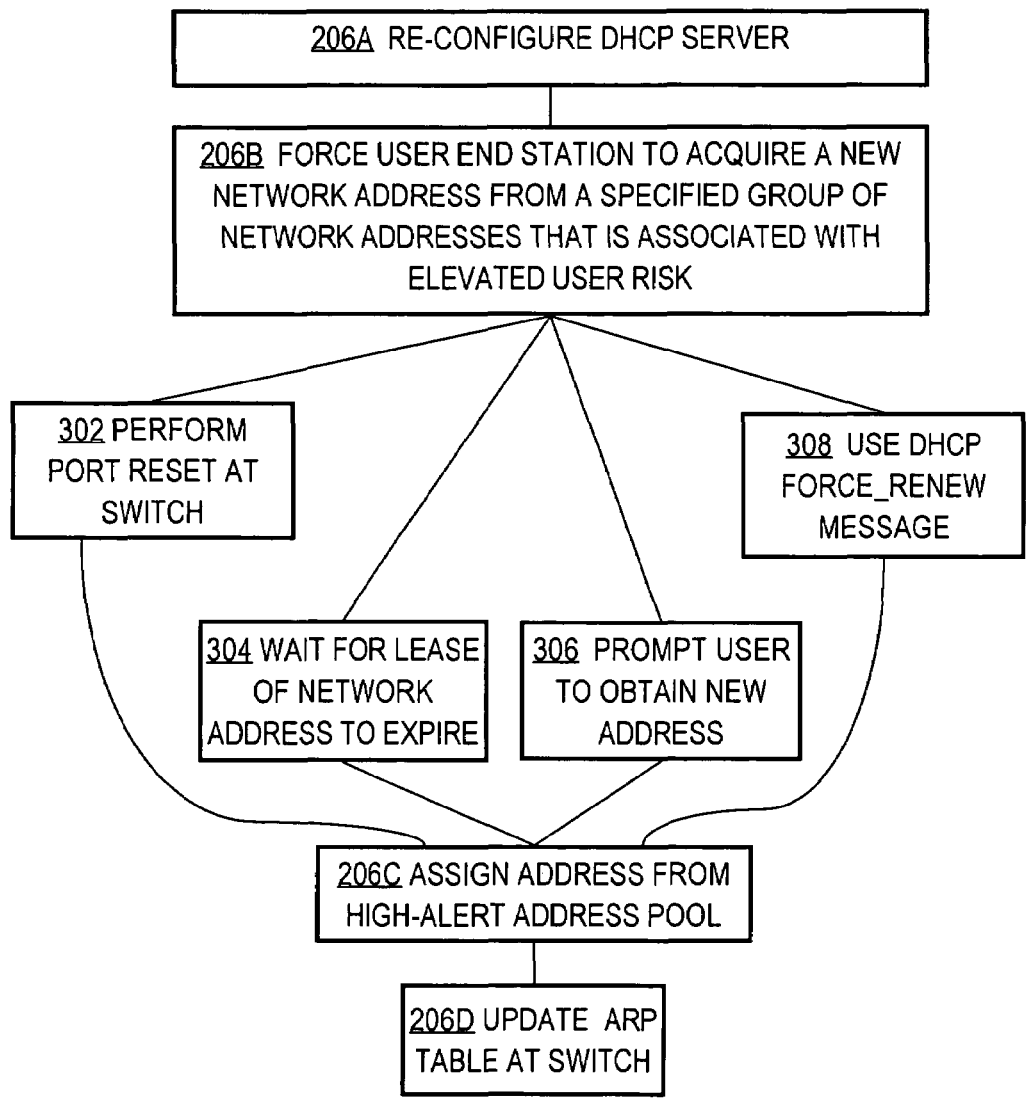
FIG. 3B is a flow diagram of a process of placing a user in an elevated risk user group.

FIG. 3B is a flow diagram of a process of placing a user in an elevated risk user group. For purposes of illustrating a clear example, FIG. 3B and the remaining drawing figures described subsequently below are described in the example context of FIG. 1B. However, the techniques described herein are applicable in other contexts.

Both FIG. 2 and FIG. 3B presume that an elevated risk user group has been created. In one embodiment in which managed network 106 is an IP packet-switched network, creating an elevated risk user group involves creating a new IP address subnet specifically for suspected subscribers or users of the managed network. The subnet may be termed a "High Alert IP Address Pool." Thus, High-Alert address pool 124B (FIG. 1B) may comprise addresses in the new IP subnet.

Creating the high alert IP address pool can be performed by requesting an IP address assignment agency, such as the Internet Corporation for Assigned Names and Numbers (ICANN) to create a globally recognized IP range that is used specifically for suspected malicious users. For example, subnet 34.34.x.x could be used. This approach is particularly useful in the context of IPv6, which provides additional address space that can be utilized to create the high-alert address range. Alternatively, a high alert IP address pool may be created within an ISP network; the pool need not be defined globally with respect to the entire internet.

Alternatively, a service provider can create a special range of IP addresses that is reserved for suspected malicious users, and can disclose parameters defining the special range to other service providers. As an example, addresses with a host IP address in the range xxx.xxx.xxx.240-250 could be designated as within the High-Alert address pool 124B. Users that receive network addresses selected from the High-Alert address pool 124B for use with a high-risk user device are said to be within a High-Alert user group.

To place a suspected user into the High-Alert group, the user's device needs to receive a new network address that is within the High-Alert address range. In one embodiment, in step 206A, DHCP server 124 is re-configured with instructions to cause the DHCP server only to serve addresses from the High-Alert address pool 124B to the user device. For example, in one embodiment, an operational support system (OSS), subscriber management system or network management station 102 configures DHCP server 124 or a DHCP server in network element 108 to assign the malicious device a network address from the High-Alert address pool 124B.

In step 206B, the user end station is forced to acquire a new network address from the High-Alert address pool. In a DHCP embodiment, the OSS causes the malicious device to send a DHCPREQUEST. As indicated in FIG. 3B, several different techniques may be used to cause the device to request a new address. For example, as shown by block 302, the OSS causes a switch or an access device, such as switch 108A, to perform a port reset. In one embodiment, block 302 involves performing the techniques described in the co-pending application of Ralph Droms, entitled "Methods and apparatus supporting configuration in a network," filed Nov. 24, 2003, the entire contents of which are hereby incorporated by reference as if fully set forth herein.

Alternatively, as shown by block 304, the OSS waits for expiration of a lease held by malicious user 120 for its then-current network address. The end station device of malicious user 120 will automatically request a new address from DHCP server 124 upon expiration or shortly before expiration. As another alternative, in block 306, the OSS or NMS 102 prompts the malicious user 120 to perform ipconfig/release and ipconfig/renew operations. As still another alternative, in block 308, the OSS or NMS 102 causes the switch 108A or other access device to send a DHCP FORCE_RENEW message, if the switch 108A or access device supports such functionality. In response, the end station device of malicious user 120 automatically requests a new address from DHCP server 124.

After performing any of the foregoing alternatives, in step 206C the DHCP server 124 assigns a client device associated with the malicious user 120 an address from the High-Alert address pool 124B. In step 206D, an ARP table at a network access device used by the suspected malicious user is updated with the new address. For example, ARP table 126 of switch 108A used by malicious user 120 is updated.

For example, as part of normal operation of an ARP process in switch 108A, the ARP process detects the new address of malicious user 120 because the new address is different from the prior address that is then-currently stored in the ARP table 126. Therefore, the ARP process automatically updates the ARP table 126 after the malicious user 120 receives or sends a first datagram. Alternatively, if a DHCP snooping or secure ARP feature is active in the access device, the ARP table 126 is automatically updated in response to switch 108A detecting a DHCP transaction between the DHCP server 124 and the malicious user 120.

2.2 Configuring Security Restrictions

FIG. 3A is a flow diagram of a process of configuring security restrictions. In one embodiment, the process of FIG. 3A is used to implement step 207 of FIG. 2.

In one embodiment, to ensure that a suspected user cannot inflict damage to the network, Access Control List (ACL) and DHCP traffic tagging are used. For example, in step 207A a MAC access control list entry is set up, and in step 207B an IP access control list entry is set up.

For example, in an implementation in which network element 108 of FIG. 1A or switch 108A of FIG. 1B is a Cisco switch or router that operates under control of the Cisco command-line interface (CLI) language, the following CLI commands can be used. As part of step 207A, a MAC ACL at the port of network element 108 or switch 108A that is coupled to the malicious user 120 is modified with the command "permit mac<user's MAC address>any". The effect of the foregoing command is to admit on the associated port only the traffic bearing the specified user's MAC address.

Similarly, an IP ACL at the user port may be modified with the command "permit ip<special IP>any". The effect of the foregoing command is to allow only traffic bearing the newly assigned special IP to enter the associated port of network element 108 or switch 108A.

Configuration of an IP ACL and MAC ACL is only one example of security measures that may be applied at step 207. Other security measures also can be applied. For example, all traffic from the suspected user can be forced to go through the monitoring server 104. In one implementation, policy routing at switch 108A can be used to first route all traffic from users having addresses in the High-Alert address pool to the monitoring server 104 before such traffic is forwarded to the actual destination.

By enforcing such stringent security in the High-Alert subnet under close monitoring, the suspected malicious user is quarantined. Such users also are placed under close monitoring and are prevented from causing further harm to the network.

2.3 Removing User from Elevated Risk User Group

Figure 4:
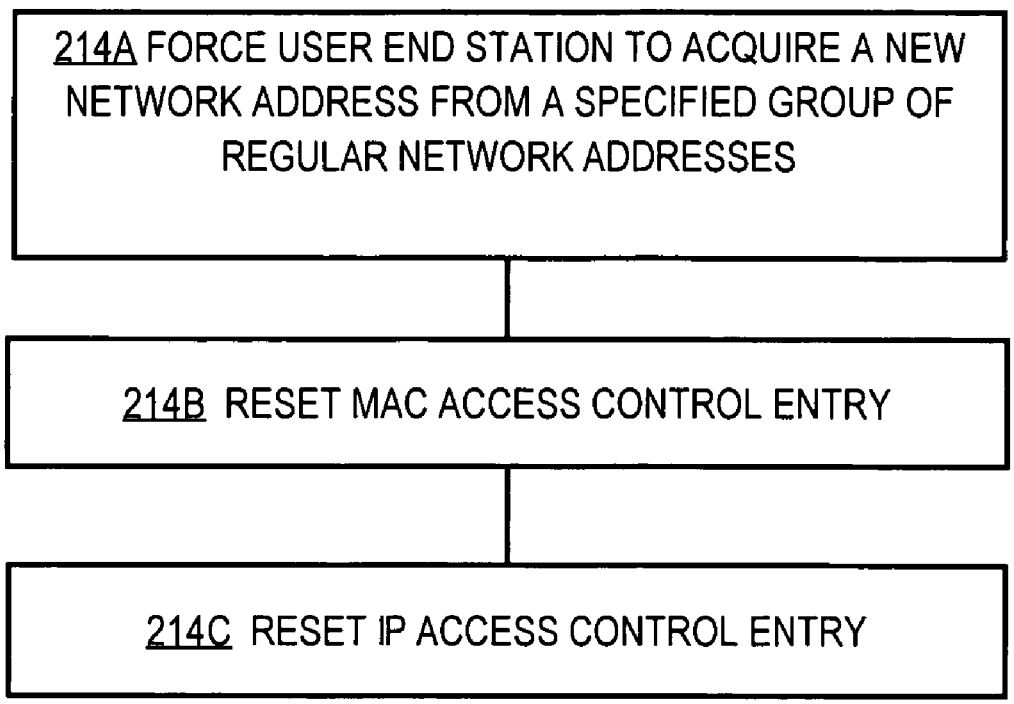
FIG. 4 is a flow diagram of a process for removing a user from an elevated risk user group.

FIG. 4 is a flow diagram of a process for removing a user from an elevated risk user group. In one embodiment, the process of FIG. 4 is used to implement step 214 of FIG. 2. Generally, FIG. 4 represents the inverse of FIG. 3A, FIG. 3B. Thus, in step 214A, the user end station is forced to acquire a new network address from a specified group of regular network addresses. The techniques of steps 206A, 302, 304, 306, 308, and 206D of FIG. 3B may be used. However, in the case of FIG. 4, the new network address assigned to the user end station is selected from a regular pool of network addresses. For example, these techniques result in DHCP server 124 (FIG. 1B) assigning an address from the Normal address pool 124A to the malicious user 120.

In step 214B, the MAC access control list entry is reset. In step 214C, the IP access control list entry is reset. Steps 214B, 214C may involve restoring a state of the MAC ACL and IP ACL for the port on which malicious user 120 is communicating with network element 108 or switch 108A to a state that it had before the user was placed in the High-Alert user group. Alternatively, steps 214B, 214C may involve issuing commands that remove the previously set security restrictions. For example, in a Cisco embodiment, the commands "permit mac any any" and "permit ip any any" may be issued.

As a result, malicious user 120 is removed from the High-Alert user group and placed into a normal user group. Security restrictions associated with the High-Alert user group are removed and the user receives un-restricted network access. During a period of monitoring by monitoring server 104 or decision by decision controller 105, the user receives restricted network access, but is not cut off from the managed network 106 completely.

3.0 Implementation Mechanisms_Hardware Overview

Figure 5:
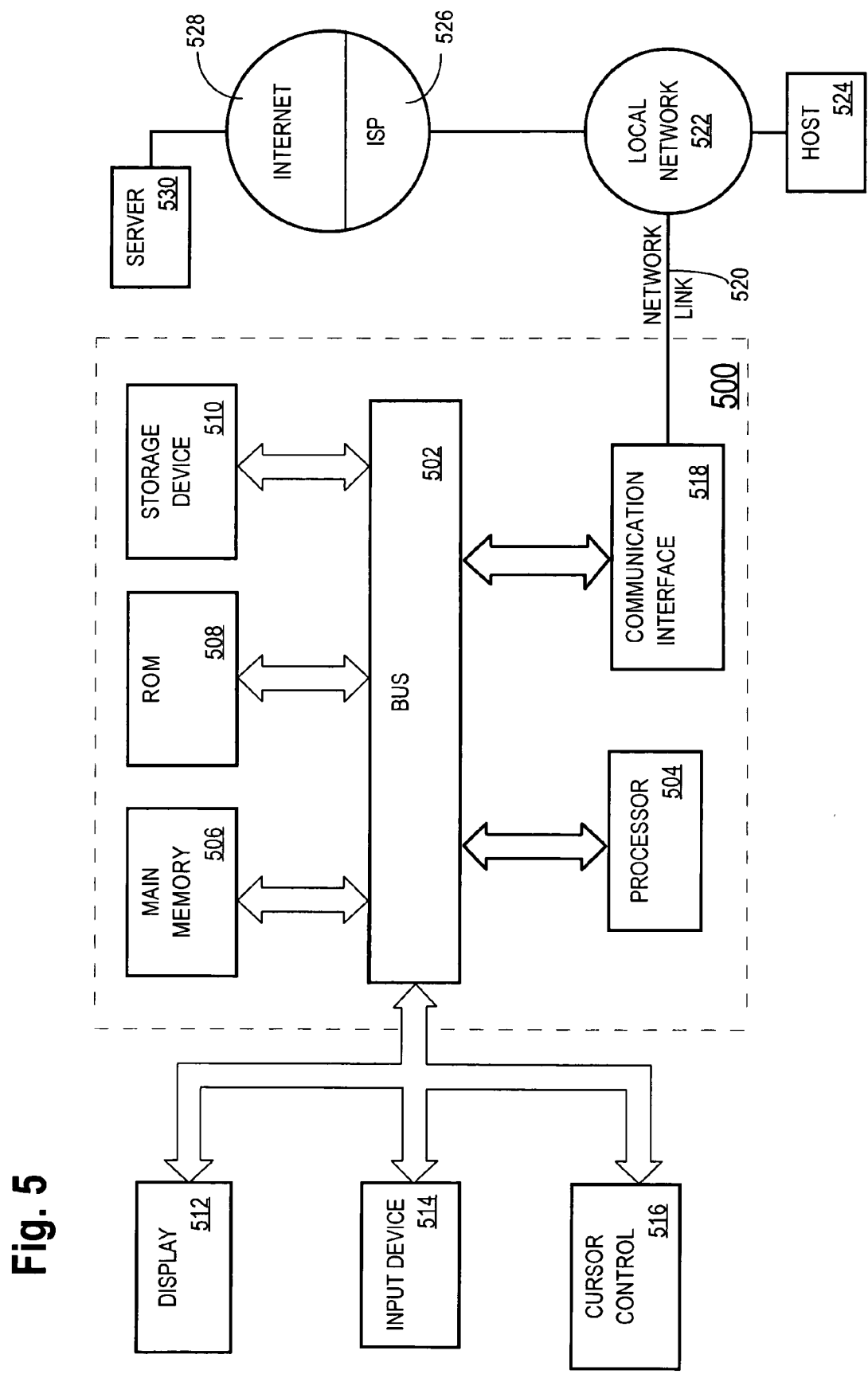
FIG. 5 is a block diagram that illustrates a computer system with which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for providing an isolation approach for network users associated with elevated risk. According to one embodiment of the invention, an isolation approach for network users associated with elevated risk is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for an isolation approach for network users associated with elevated risk as described herein.

The received code may be executed by processor 504 as it is received, and/or stored in storage device 510, or other non-volatile storage for later execution. In this manner, computer system 500 may obtain application code in the form of a carrier wave.

4.0 Extentions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the computer-implemented steps of:
in a security controller that is coupled, through a network, to a network device having a first network address assigned from a first subset of addresses within a first specified pool associated with normal network users:
determining a user identifier associated with the network device that has caused a security event in the network;
in response to the security event, causing the network device to acquire a second network address that is selected from a second subset of addresses within a second specified pool associated with suspected malicious network users;
wherein the security event is an event that indicates at least one of: a possible denial of service attack, possible IP address spoofing, extraneous requests for network addresses, and possible MAC address spoofing;
wherein the second subset of addresses is different from the first subset of addresses; and
configuring one or more security restrictions with respect to the second network address.

2. A method as recited in claim 1, further comprising the steps of:
receiving information identifying the security event in the network;
correlating the security event information with network user information to result in determining the user identifier associated with the network device.

3. A method as recited in claim 1, wherein the network device uses dynamic host control protocol (DHCP) to obtain the second network address, and wherein the step of causing the network device to acquire the second network address comprises waiting for expiration of a lease for a current network address of the network device.

4. A method as recited in claim 1, wherein the step of causing the network device to acquire the second network address comprises the step of providing the network device with an IP address that is selected from a plurality of IP addresses within a special IP subnet.

5. A method as recited in claim 4, further comprising the step of publishing information describing characteristics of the special IP subnet to network service providers.

6. A method as recited in claim 1, wherein the step of configuring security restrictions comprises the steps of modifying an internet protocol (IP) access control list (ACL) associated with a port that is coupled to the network device to permit entry of IP traffic from only the second network address.

7. A method as recited in claim 1, wherein the step of configuring security restrictions comprises the steps of modifying a media access control (MAC) ACL associated with a port that is coupled to the network device to permit entry of traffic only for a MAC address that is bound to the second network address.

8. A method as recited in claim 1, further comprising the steps of determining whether a malicious act caused the security event, and if so, providing information about the security event or malicious act to a security decision controller.

9. A method as recited in claim 1, further comprising the steps of determining whether a malicious act caused the security event, and if not, removing the user from the second specified pool.

10. A method as recited in claim 1, further comprising the steps of determining whether a malicious act caused the security event, wherein a legal user action in the network is not determined to be a malicious act if the user is associated with a trusted customer of a network service provider.

11. A computer-readable storage medium carrying one or more sequences of instructions, which instructions, when executed by one or more processors, cause the one or more processors to carry out the steps of:
in a security controller that is coupled, though a network, to a network device having a first network address assigned from a first subset of addresses within a first specified pool associated with normal network users:
determining a user identifier associated with the network device that has caused a security event in the network;
in response to the security event, causing the network device to acquire a second network address that is selected from a second subset of addresses within a second specified pool associated with suspected malicious network users;
wherein the security event is an event that indicates at least one of: a possible denial of service attack, possible IP address spoofing, extraneous requests for network addresses, and possible MAC address spoofing;
wherein the second subset of addresses is different from the first subset of addresses; and
configuring one or more security restrictions with respect to the second network address.

12. An apparatus, comprising:
in a security controller that is coupled, though a network, to a network device having a first network address assigned from a first subset of addresses within a first specified pool associated with normal network users:
means for determining a user identifier associated with the network device that has caused a security event in the network;
means for, in response to the security event, causing the network device to acquire a second network address that is selected from a second subset of addresses within a second specified pool associated with suspected malicious network users;
wherein the security event is an event that indicates at least one of: a possible denial of service attack, possible IP address spoofing, extraneous requests for network addresses, and possible MAC address spoofing;
wherein the second subset of addresses is different from the first subset of addresses; and
means for configuring one or more security restrictions with respect to the second network address.

13. An apparatus, comprising:
a network interface that is coupled to a data network for receiving one or more packet flows therefrom;
a processor;
one or more stored sequences of instructions which, when executed by the processor, cause the processor to carry out the steps of:
in a security controller that is coupled, though the data network, to a network device having a first network address assigned from a first subset of addresses within a first specified pool associated with normal network users:
determining a user identifier associated with the network device that has caused a security event in the network;
in response to the security event, causing the network device to acquire a second network address that is selected from a second subset of addresses within a second specified pool associated with suspected malicious network users;
wherein the security event is an event that indicates at least one of: a possible denial of service attack, possible IP address spoofing, extraneous requests for network addresses, and possible MAC address spoofing;
wherein the second subset of addresses is different from the first subset of addresses; and
configuring one or more security restrictions with respect to the second network address.

14. The apparatus of claim 13, wherein the network device uses dynamic host control protocol (DHCP) to obtain the second network address, and wherein the instructions which when executed cause the network device to acquire a second network address comprise instructions which when executed cause resetting a port that is coupled to the network device to prompt a user to command the network device to request a new network address using DHCP.

15. The apparatus of claim 13, wherein instructions which when executed cause the network device to acquire a second network address comprise instructions which when executed cause providing the network device with an IP address that is selected from a plurality of IP addresses within a special IP subnet.

16. The apparatus of claim 13, wherein the network device uses dynamic host control protocol (DHCP) to obtain the second network address, and wherein the instructions which when executed cause the network device to acquire a second network address comprise instructions which when executed cause issuing a DHCP FORCE_RENEW message to the network device.

17. The computer-readable storage medium of claim 11, wherein the network device uses dynamic host control protocol (DHCP) to obtain the second network address, and wherein the instructions which, when executed, cause the network device to acquire the second network address comprise instructions which when executed cause resetting a port that is coupled to the network device to prompt a user to command the network device to request a new network address using DHCP.

18. The computer-readable storage medium of claim 11, wherein the network device uses dynamic host control protocol (DHCP) to obtain the second network address, and wherein the instructions which when executed cause the network device to acquire the second network address comprise instructions which when executed cause issuing a DHCP FORCE_RENEW message to the network device.

19. The computer-readable storage medium of claim 11, wherein instructions which when executed cause the network device to acquire a second network address comprise instructions which when executed cause providing the network device with an IP address that is selected from a plurality of IP addresses within a special IP subnet.

20. The apparatus of claim 12, wherein the network device uses dynamic host control protocol (DHCP) to obtain the second network address, and wherein the means for causing the network device to acquire the second network address comprise means for resetting a port that is coupled to the network device to prompt a user to command the network device to request a new network address using DHCP.

21. The apparatus of claim 12, wherein the network device uses dynamic host control protocol (DHCP) to obtain the second network address, and wherein the means for causing the network device to acquire the second network address comprise means for issuing a DHCP FORCE_RENEW message to the network device.

22. The apparatus of claim 12, wherein the means for causing the network device to acquire a new network address comprise means for providing the network device with an IP address that is selected from a plurality of IP addresses within a special IP subnet.

23. The method of claim 1, wherein causing the network device to acquire a second network address comprises performing an action that causes the network device to request a new network address.

24. A method, comprising the computer-implemented steps of:
   in a security controller that is coupled, though a network, to a network device having a first network address assigned from a first subset of addresses within a first specified pool associated with normal network users:
      in response to a security event in the network, causing the network device to acquire a second network address that is selected from a second subset of addresses within a second specified pool associated with suspected malicious network users;
      wherein the security event is an event that indicates at least one of: a possible denial of service attack, possible IP address spoofing, extraneous requests for network addresses, and possible MAC address spoofing; wherein causing the network device to acquire a second network address comprises performing an action that causes the network device to request a new network address;
      wherein the second subset of addresses is different from the first subset of addresses; and
      configuring one or more security restrictions with respect to the new network address.

25. The apparatus as recited in claim 13, wherein the one or more stored sequences of instructions, when executed by the processor, further cause the processor to perform:
   receiving information identifying the security event in the network;
   correlating the security event information with network user information to result in determining the user identifier associated with the network device.

26. The apparatus as recited in claim 13, wherein the network device uses dynamic host control protocol (DHCP) to obtain the second network address, and wherein causing the network device to acquire the second network address comprises prompting the network device to request a new network address using DHCP.

27. The apparatus as recited in claim 13, wherein the network device uses dynamic host control protocol (DHCP) to obtain the second network address, and wherein causing the network device to acquire the second network address comprises waiting for expiration of a lease for a current network address of the network device.

28. The apparatus as recited in claim 15, wherein the one or more stored sequences of instructions, when executed by the processor, further cause the processor to perform:
   publishing information describing characteristics of the special IP subnet to network service providers.

29. The apparatus as recited in claim 13, wherein configuring security restrictions comprises modifying an internet protocol (IP) access control list (ACL) associated with a port that is coupled to the network device to permit entry of IP traffic from only the second network address.

30. The apparatus as recited in claim 13, wherein configuring security restrictions comprises modifying a media access control (MAC) ACL associated with a port that is coupled to the network device to permit entry of traffic only for a MAC address that is bound to the second network address.

31. The apparatus as recited in claim 13, wherein the one or more stored sequences of instructions, when executed by the processor, further cause the processor to perform:
   determining whether a malicious act caused the security event, and if so, providing information about the security event or malicious act to a security decision controller.

32. The apparatus as recited in claim 13, wherein the one or more stored sequences of instructions, when executed by the processor, further cause the processor to perform:
   determining whether a malicious act caused the security event, and if not, removing the user from the second specified pool.

33. The apparatus as recited in claim 13, wherein the one or more stored sequences of instructions, when executed by the processor, further cause the processor to perform:
   determining whether a malicious act caused the security event, wherein a legal user action in the network is not determined to be a malicious act if the user is associated with a trusted customer of a network service provider.

34. The apparatus as recited in claim 13, wherein causing the network device to acquire a second network address comprises performing an action that causes the network device to request a new network address.

35. The apparatus as recited in claim 12, further comprising:
   means for receiving information identifying the security event in the network; and
   means for correlating the security event information with network user information to result in determining the user identifier associated with the network device.

36. The apparatus as recited in claim 12, wherein the network device uses dynamic host control protocol (DHCP) to obtain the second network address, and wherein the means for causing the network device to acquire the second network address comprises means for prompting the network device to request a new network address using DHCP.

37. The apparatus as recited in claim 12, wherein the network device uses dynamic host control protocol (DHCP) to obtain the second network address, and wherein the means for causing the network device to acquire the second network address comprises waiting for expiration of a lease for a current network address of the network device.

38. The apparatus as recited in claim 22, further comprising:
   means for publishing information describing characteristics of the special IP subnet to network service providers.

39. The apparatus as recited in claim 12, wherein the means for configuring security restrictions comprises means for modifying an internet protocol (IP) access control list (ACL) associated with a port that is coupled to the network device to permit entry of IP traffic from only the second network address.

40. The apparatus as recited in claim 12, wherein the means for configuring security restrictions comprises means for modifying a media access control (MAC) ACL associated with a port that is coupled to the network device to permit entry of traffic only for a MAC address that is bound to the second network address.

41. The apparatus as recited in claim 12, further comprising:
means for determining whether a malicious act caused the security event, and if so, providing information about the security event or malicious act to a security decision controller.

42. The apparatus as recited in claim 12, further comprising:
means for determining whether a malicious act caused the security event, and if not, removing the user from the second specified pool.

43. The apparatus as recited in claim 12, further comprising:
means for determining whether a malicious act caused the security event, wherein a legal user action in the network is not determined to be a malicious act if the user is associated with a trusted customer of a network service provider.

44. The apparatus as recited in claim 12, wherein the means for causing the network device to acquire a second network address comprises means for performing an action that causes the network device to request a new network address.

45. A method as recited in claim 24, wherein the network device uses dynamic host control protocol (DHCP) to obtain the second network address, and wherein the step of causing the network device to acquire the second network address comprises resetting a port that is coupled to the network device to prompt a user to command the network device to request a new network address using DHCP.

46. A method as recited in claim 24, wherein the network device uses dynamic host control protocol (DHCP) to obtain the second network address, and wherein the step of causing the network device to acquire the second network address comprises issuing a DHCP FORCE_RENEW message to the network device.

47. A method as recited in claim 24, wherein the network device uses dynamic host control protocol (DHCP) to obtain the second network address, and wherein the step of causing the network device to acquire the second network address comprises prompting the network device to request a new network address using DHCP.

* * * * *

UNITED STATES PATENT AND TRADEMARK OFFICE
CERTIFICATE OF CORRECTION

| | | |
|---|---|---|
| PATENT NO. | : 7,607,021 B2 | Page 1 of 1 |
| APPLICATION NO. | : 10/797773 | |
| DATED | : October 20, 2009 | |
| INVENTOR(S) | : Rayes et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 997 days.

Signed and Sealed this

Fourteenth Day of December, 2010

David J. Kappos
*Director of the United States Patent and Trademark Office*